Patented Sept. 18, 1951

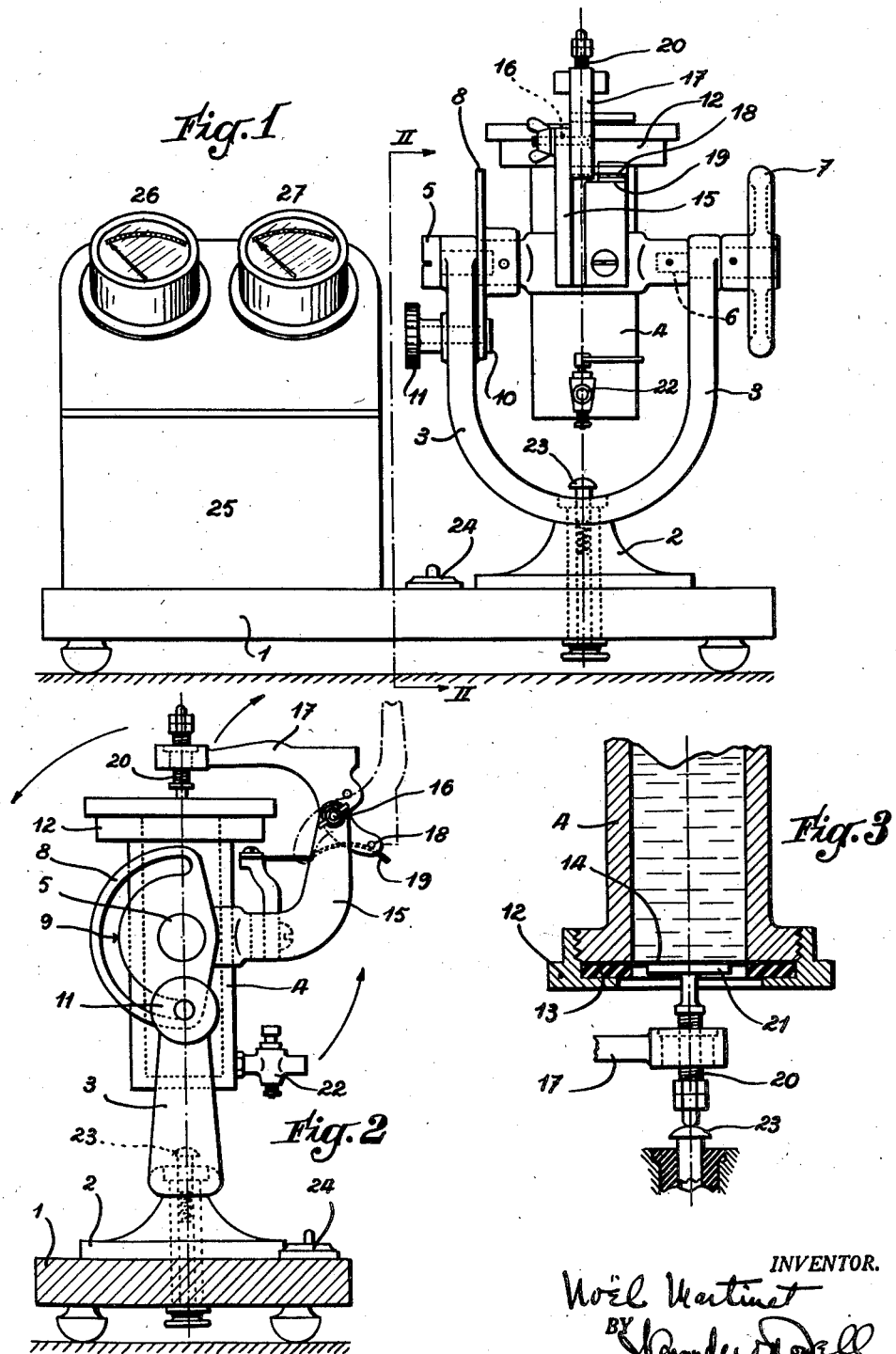

2,568,199

UNITED STATES PATENT OFFICE 2,568,199

METHOD AND APPARATUS FOR TESTING PAPERS AND THE LIKE

Noël Martinet, Fures, France, assignor to Société des Papiers et Cartons Couchés "Lux," Fures, France, a French joint-stock company Application February 17, 1948, Serial No. 8,966
In France May 5, 1945

Section 1, Public Law 690, August 8, 1946
Patent expires May 5, 1965

8 Claims. (Cl. 175—183)

My invention relates to the testing of paper or cardboard to determine the permeability of the same to fluids and more particularly to inks of all kinds.

It is known that the permeability of a paper or cardboard is dependent on a large number of factors, such as the thickness and density of the sheet, and above all the sizing used in the manufacture. This permeability should be known in most cases and it is particularly essential to ascertain the permeability to ink of paper intended to bear handwriting, drawings or printing.

In a very primitive method, which is often used in practice, lines are drawn on the sheet of paper to be tested by means of a given pen or drawing pen, and when the ink is dry, the back of the sheet is examined to ascertain if the paper is correctly sized. But this operation involves an important personal factor and it does not lead to an accurate result which may be taken as a reliable basis for the manufacture. Another method consists in causing a fragment of paper to float on an ink bath; the ink progressively permeates the paper, thus giving rise to a change of color of the upper face thereof, and the permeability is determined by this change. But here also this determination is dependent on the personal factor of the operator; the unavoidable evaporation disturbs the phenomena; and the method is very delicate and unprecise when the paper is itself colored in dark hues.

It has also been proposed to determine the permeability of paper or cardboard by electric means, the sample being brought into contact with distilled water. This method gives more accurate results which are not dependent upon an operator's skill, but the results obtained do not correspond to the practical conditions of use, since it is exceptional that a paper should be employed in connection with distilled water.

It is an object of my invention to provide a method which will permit an easy and correct measure of the permeability of paper or cardboard to any kind of ink in connection with which it is to be used.

Another object of my invention is to provide a method for testing paper or cardboard, wherein the sample to be tested is disposed between two electrodes inserted in a measuring circuit and is brought into contact with ink under given conditions of pressure and temperature.

A further object of my invention is to provide a method as above defined, wherein the permeability of the sample under test is determined by the time required by the current to reach a given value in the measuring circuit, under constant voltage conditions.

Still another object of my invention is to provide a method as above defined, wherein one of the electrodes is formed of the ink intended to impregnate the sample, whereby free access is afforded for the ink to the whole surface of the sample.

My invention is also concerned with two different apparatus adapted for carrying into practice the above method.

In the first type of apparatus according to my invention there is provided an invertible ink reservoir the open upper end of which is adapted to be closed by the sample to be tested, an electrode being applied against the upper face thereof. When the reservoir is inverted, the sample forms the bottom thereof while the mass of ink within the reservoir forms the second measuring electrode. Means are preferably provided for opening a hole in the closed end of the reservoir as soon as inversion of the latter is effected, whereby ink pressure on the sample exactly corresponds to the height of liquid in the reservoir.

In the second type of apparatus, which is practically intended for testing light and porous papers, there is provided an electrode against which the sample cut in the form of a band is clamped with an end thereof projecting beyond the edge of the electrode, and an ink trough into which the projecting end of the sample is adapted to dip, the said trough forming the second electrode in the measuring circuit.

In the annexed drawing:

Fig. 1 is an elevation of an apparatus established in accordance with my invention, at the position of rest.

Fig. 2 is a section thereof taken along line II—II of Fig. 1.

Fig. 3 is a partial longitudinal section of the reservoir at the measuring position.

The apparatus illustrated in Figs. 1 to 3 comprises a supporting plate 1 on which there is mounted a base 2 carrying a bifurcated frame 3. A cylindrical reservoir is disposed between the two branches of frame 3 and pivoted to the same about a horizontal axis transverse to the reservoir and passing substantially midway of the ends thereof. The pivot is formed by a screw 5 on one side of the reservoir and on the other side thereof by a spindle 6 carrying an actuating handwheel 7 at its outer end. To reservoir 4 and in co-axial relation to the pivoting axis thereof there is fixed a sector 8 provided with a semi-circular opening 9 through which is passed a threaded rod 10 carried by the next branch of frame 3, the said rod being provided with a milled nut 11 by means of which sector 8 and reservoir 4 may be locked at any desired position.

Reservoir 4 has a closed end and an open end. At the position of rest the open end is the upper one while the closed end forms the bottom (position of Figs. 1 and 2). When the reservoir is inverted (position of Fig. 3) the closed end becomes the upper one while the open end is the lower one.

The open end of reservoir 4 is threaded externally to receive a threaded ring 12 having a projecting inner edge adapted to clamp against the upper edge of reservoir 4 an annular packing and a circular sample of the paper or cardboard to be tested. In the section of Fig. 3 the annular packing is shown at 13 and the circular sample at 14.

Reservoir 4 is laterally provided with an arm 15 situated in an axial plane perpendicular to the pivoting axis of the reservoir to frame 3 and on arm 15 there is articulated at 16 a movable arm 17 provided with a lug against which bears a spring blade 19. A threaded rod 20 is passed through the free end of arm 17, such rod forming the tail portion of a flat circular electrode 21 (Fig. 3). Electrode 21 is insulated from the body of the apparatus for instance by means of a sleeve of insulating material carried by the end of arm 17 and through which rod 20 is driven.

Reservoir 4 is provided with a cock 22 disposed at the level of its bottom.

Frame 3 carries a spring-pressed contact 23 having a rounded external head. Contact 23 is disposed in axial relation with respect to frame 3 and it is insulated therefrom by an insulating sleeve housed within base 2. It is adapted to bear against the end of rod 20 when reservoir 4 is inverted, as explained below.

The apparatus also comprises a push-button 24 to control the measuring circuit and a panel 25 supporting a milliammeter 26 and a voltmeter 27.

The measuring circuit comprises an appropriate electric source of direct or alternating current under an appropriate voltage. Current may be derived from the usual lines, the desired voltage being obtained by means of a potentiometer or of an adjustable transformer. This circuit comprises button 24 and milliammeter 26. One end of the said circuit is connected to contact 23 and the other one to the body of frame 3.

The operation is as follows:

The apparatus being at the position of rest, cock 22 closed and the upper end of reservoir 4 open, arm 17 is first raised about pivot 16 until it is brought to the position indicated in broken lines in Fig. 2. At this position electrode 21 clears the aperture of the apparatus. Arm 17 is retained by spring 19.

Ink is then poured into reservoir 4 until the height of liquid reaches a predetermined value selected as a basis for the test, for instance 10 centimetres. Sample 14, previously cut by means of a hollow punch in the sheet to be tested, is then carefully disposed and clamped under ring 12 and packing 13. Arm 17 is thereafter returned to its former position whereby electrode 21 is caused to bear against the upper face of the sample. Rod 21 has been previously adjusted in such a manner that contact between electrode 21 and sample 14 takes place over the whole area of the latter.

Reservoir 4 is then rapidly inverted, cock 22 is opened and an appropriate chronometer is started. Due to the inversion, rod 20 comes into contact with the head of contact 23, as indicated in Fig. 3, and the poles of the electric circuit are now applied to the ink, through the body of the apparatus, and to electrode 21. Sample 14 is thus, so to speak, clamped between a solid electrode 21 and a liquid electrode formed by the mass of ink, the pressure of which is exactly equal to the selected height of liquid, i. e. 10 centimetres.

The electric resistance of the paper at first extremely high when the sample is dry, decreases as the ink impregnates the same by capillarity. This decrease is observed by pressing from time to time the push-button 24 and by ascertaining the corresponding deviation of milliammeter 26. When the latter indicates a current of predetermined value, for instance 50 milliamperes, the time is noted and the test is stopped.

It will easily be understood that under such conditions, if the test is always effected with the same ink, under the same height of liquid, at the same temperature, with the same sort of current (preferably alternating current to avoid or reduce polarization phenomena) and under the same voltage, the time noted is a very precise and very sure measure of the porosity of the sample under test. It is of advantage in actual practice to effect a plurality of tests on a number of samples cut in several parts of the sheet to obtain a mean value taking into account the unavoidable irregularities in the constitution of the sheet. This mean time corresponds to the degree of sizing of the paper or cardboard and a sizing index may be obtained by means of a formula such as:

$$c = \frac{100}{P}\sqrt[3]{T}$$

wherein P is the weight of the paper or cardboard in grammes per square metre and T the time noted (or the mean value calculated from a number of tests). The coefficients of the formula may vary according to the conditions selected for the test.

It is important for the regularity of the test to use an ink having as its basis a solution with a pH equal to the pH of the cellulose end of the sizing to avoid the apperance of undesirable E. M. F. liable to interfere with the test and to obtain a constant ionized acidity and a regular surface tension.

The use of a push-button permits of limiting application of current to the very short periods necessary to read the milliammeter and avoids the phenomena of polarization which might otherwise occur even in alternating current. The provision of cock 22 ensures a regular pressure of the liquid against the sample. The tests effected in accordance with my invention by means of the apparatus described therefore lead to reliable results. It is to be noted that such results are obtained with the liquid with which the paper will be in contact in use, whereby they preserve their full practical significance.

I claim:

1. A method for testing permeability of paper and like sheet material to liquids such as ink, which consists in disposing a sample of the material to be tested against a horizontal solid electrode on one of its sides; in bringing the liquid in connection with which permeability is to be measured into contact with the other side of said sample under given conditions of temperature and pressure to form a second electrode for said sample, the said solid and liquid electrodes being inserted in an electric measuring circuit, and in determining the time necessary for the current to reach a predetermined intensity in said measuring circuit.

2. An apparatus for testing permeability of paper or like sheet material comprising an invertible cylindrical reservoir having a closed bottom end and an open end thereopposite and being adapted to receive a given quantity of the liquid in connection with which the material is to be tested; means to tightly clamp on said open end a sample of the material to be tested whereby when the reservoir is inverted, the liquid will be supported thereon from below; an insulated electrode adapted to bear against the outer side of said sample when same is disposed on said reservoir; and valve means to connect to the atmosphere the closed bottom of said reservoir when said reservoir has been inverted.

3. In apparatus as set forth in claim 2, said cylindrical reservoir pivotally carried by a bifurcated support having a horizontal axis transverse to the axis of said reservoir, a sector plate having a semi-circular slot and fixed on said reservoir about said axis; and a locking screw carried by said support and transfixing said slot whereby said reservoir may be selectively locked in vertically up or vertically down position.

4. A method for testing the permeability of paper and for measuring the sizing index thereof which consists in disposing a sample thereof between a solid electrode and a mass of ink having a pH substantially equal to the pH of cellulose and of the sizing; in applying a voltage difference between said solid electrode and said mass of ink; and in determining the time necessary for the current through the sample to reach a predetermined low intensity under constant conditions of temperature, pressure and voltage difference.

5. A method as claimed in claim 4, wherein the sizing index of the paper tested is deduced from the time noted by the formula:

$$c = \frac{100}{P} \sqrt[3]{T}$$

wherein T is the mean time noted from a series of tests, P the weight of the paper tested per square unit, and the 100 a coefficient dependent on the units used and on the conditions of temperature, pressure and voltage difference of the tests.

6. An apparatus for testing permeability of paper or like sheet material comprising a bifurcated vertical support; an invertible cylindrical reservoir disposed in said support and pivotally carried thereby about a horizontal axis transverse to the axis of said reservoir, said reservoir having a closed bottom end and an open upper end thereopposite and being adapted to receive in upright position a given quantity of the liquid in connection with which the material is to be tested; means on said reservoir to tightly clamp on said open end a sample of the material to be tested whereby when the reservoir is inverted, the liquid will be supported thereon from below; an insulated electrode pivotally carried by said reservoir about an axis transverse to the axis of said reservoir and laterally disposed with respect to said reservoir, said electrode being adapted to operatively bear against the outer face of said sample when same is disposed on said reservoir; means to lock said electrode at its operative position; and valve means to connect to the atmosphere the closed bottom of said reservoir when the latter has been inverted.

7. In an apparatus as claimed in claim 6, said electrode having a threaded tail adjustably screwed at the end of a pivoted supporting arm fixed to the reservoir.

8. In an apparatus as claimed in claim 6, electrical measuring means connected to said liquid; and an insulated electric contact resiliently carried by said support and connected to said measuring means to contact said electrode at the inverted position of said reservoir and at the operative position of said electrode.

NOËL MARTINET.

REFERENCES CITED

The following references are of record in the file of this patent:

UNITED STATES PATENTS

| Number | Name | Date |
| --- | --- | --- |
| 1,391,041 | Boon et al. | Sept. 20, 1921 |
| 1,545,186 | Henriksen et al. | July 7, 1925 |
| 1,953,155 | Currier | Apr. 3, 1934 |
| 2,491,689 | Pollock | Dec. 20, 1949 |